(No Model.)

H. E. PRIDMORE.
CLUTCH.

No. 272,152.  Patented Feb. 13, 1883.

WITNESSES
Wm A. Skinkle
H. W. Elmore

INVENTOR
Henry E. Pridmore.
By his Attorneys
Pancuisen & Pancuison

UNITED STATES PATENT OFFICE.

HENRY E. PRIDMORE, OF CHICAGO, ILLINOIS, ASSIGNOR TO THE McCOR-
MICK HARVESTING MACHINE COMPANY, OF SAME PLACE.

CLUTCH.

SPECIFICATION forming part of Letters Patent No. 272,152, dated February 13, 1883.

Application filed December 7, 1882. (No model.)

*To all whom it may concern:*

Be it known that I, HENRY E. PRIDMORE, of Chicago, in the county of Cook and State of Illinois, have invented certain new and useful Improvements in Clutches, of which the following is a specification.

My invention relates to one-way clutches or backing-ratchets used in harvesters and other agricultural machinery, and elsewhere in mechanism where it is desired to transmit motion in one direction only, and there is liability of a reversal of the prime motor, especially to such as are composed of a dog or pawl moving in a plane transverse to the rotating shaft or axle and engaging with the ratchet-teeth of an inner disk or circumjacent rim; and it consists in the combination, with the dog or pawl, in a clutch of said description, and with the casing in which it is contained, of a cam-button whereby the dog may be moved out of engagement and locked against return; in the combination, with said dog or pawl, of the wheel which it drives or by which it is driven, a ratchet-chamber formed in said wheel, a disk pinned to the shaft upon which the wheel is mounted, closing said chamber and having the dog pivoted to its inner face, a spindle passing through an elongated slot in said disk and entering the point of the dog to enable the latter to be retracted from the ratchet-teeth, and a locking device whereby said spindle and dog may be secured against return toward the teeth; in the combination, with said dog or pawl, of the wheel which it drives or by which it is driven, a ratchet-chamber formed in said wheel, a disk pinned to the shaft upon which the wheel is mounted, closing said chamber and having the dog pivoted to its inner face, a spindle passing through an elongated slot in said disk and entering the point of the dog to enable the latter to be retracted from the ratchet-teeth, a button or cam on the outer end of this spindle, rotating with it or upon it, and a recessed rib on the outer face of the disk to receive said button or cam when turned, whereby the dog will be held from re-engagement with the teeth, and in the various other combinations and details of construction hereinafter described and claimed.

Figure 1:
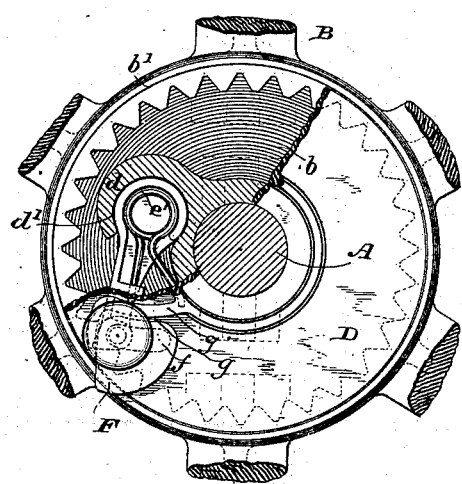
Figure 3:
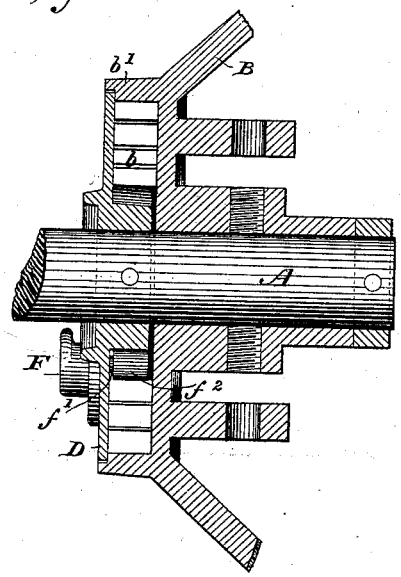
Figure 2:
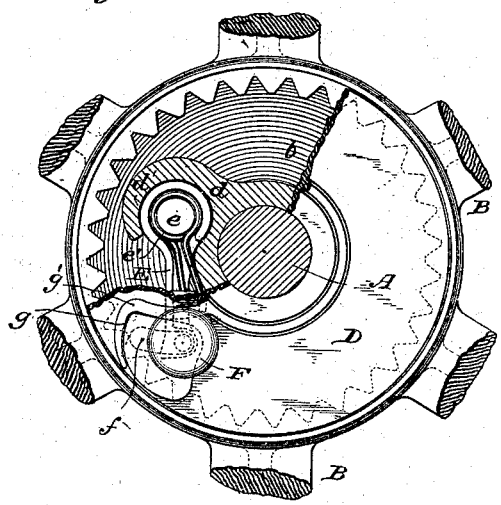
Figure 4:
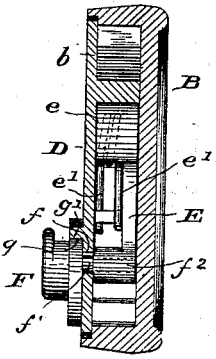
Figure 5:
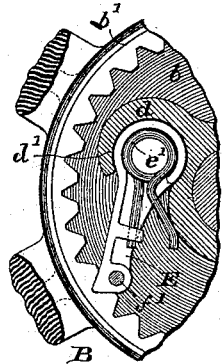

In the drawings, Figure 1 is an elevation, partly broken away, of a clutch embodying my invention, showing the dog engaged with the ratchet; Fig. 2, a like elevation with the dog thrown away from the ratchet and locked against engagement; Fig. 3, a diametrical section therethrough; Fig. 4, a sectional detail, and Fig. 5 a view of the pawl and its spring.

A is a shaft or axle, and B any wheel mounted loosely thereon. In the hub of this wheel is formed a chamber, $b$, having a ratchet-rim, $b'$, with internal teeth, which is the most compact and effective arrangement for the purpose. A disk, D, is pinned to the shaft, on the chambered side of the wheel, completely closing the chamber, so as to shield the mechanism therein. From the hub of the disk, within the chamber, is an offset, $d$, having a cylindriform recess, $d'$, with an opening or throatway to one side. In this recess is set the cylindrical head $e$ of the dog E, having its tongue passing through and playing in the lateral throat or opening. The head is socketed to receive the coil of a spring, $e'$, one end of which bears against the hub and the other against the tongue of the dog to force it into engagement with the ratchet-teeth. Near the point of the dog an oblong slot, $f$, is cut through the covering-disk on an arc concentric with the axis of said dog. A spindle, $f'$, bearing at its outer end a latch or cam-button, F, resting upon the face of the disk, passes through the slot to a pivotal seat, $f^2$, in the end of the dog, or is pinned in said end, while its latch or button is left free to be turned. When the dog is in engagement the spindle will be at the outer end of the slot. In order to disengage it, said spindle is pressed back toward the other end, and the button then turned until its cam or latch enters into a recess, $g$, of suitable shape, formed within or by means of a web or rib, $g'$, on the face of the covering-disk, where it will be kept by the pressure of the spring until intentionally released by turning the button, until which is done the dog will be securely locked out of engagement.

It is obvious that the details of my invention may be to some extent modified or altered without departing from its principle, that either shaft or wheel may be driven, and that the wheel may, according to circumstances, be a spur or other gear, a pulley, or the supporting and driving wheel of some field-machine.

I claim—

1. The combination, substantially as hereinbefore set forth, of the wheel formed with a ratchet-chamber, the disk pinned to the shaft upon which said wheel is mounted, and closing said chamber, the dog pivoted to the inner face of said disk, the spring pressing said dog into engagement, the spindle passing from the point of the dog through an elongated recess in the disk, whereby said dog may be pushed out of engagement, and a locking device whereby it may be fixed in said disengaged position.

2. The combination, substantially as hereinbefore set forth, of the wheel formed with a ratchet-chamber, the disk pinned to the shaft upon which said wheel is mounted, and closing said chamber, the dog pivoted in an extension of the hub of said disk within the chamber, the spring pressing said dog into engagement, the button having a spindle which passes through an elongated slot in said disk and enters the point of the dog, and the cam or latch of which sits upon the outer face of said disk, and the recessed rib on said outer face to receive said cam, whereby the dog may be thrown out of engagement by pushing the button and locked against return by rotating it until the cam takes into said recess.

3. The combination, substantially as hereinbefore set forth, of the wheel, its ratchet-chamber, a disk pinned to the shaft upon which said wheel is mounted, and closing said chamber, an offset from the hub of said disk within the chamber, having a cylindriform recess with an opening to one side, a dog having a cylindrical head which sits in said recess and permits the tongue to play through said opening, a spring urging the dog toward engagement with the ratchet-teeth of the chamber, and the button the spindle of which passes through a slot in the disk and enters the point of the dog, and the cam of which rests against the outer face of the disk and may be latched into a recess in a projecting rib therefrom, whereby the dog may be thrown out of engagement and locked into disengaged position.

4. The combination, substantially as hereinbefore set forth, of the wheel having a ratchet-chamber, the disk pinned to the shaft or axle upon which said wheel is mounted, and closing said chamber, the offset from the hub of said disk within the chamber, having a cylindriform recess with an opening to one side, the dog, with its cylindrical head, situated in said recess and playing through said opening, and the annular seat within said head, receiving the coil of a spring one end of which presses against the hub and the other against the dog to force the latter into engagement.

5. The combination, substantially as hereinbefore set forth, of the wheel, the ratchet-chamber, the disk pinned to the shaft upon which said wheel is mounted, and closing the chamber, the offset from the hub of said disk within the chamber, provided with a cylindriform recess having an opening through one side, the dog seated within said recess by means of its cylindrical head and playing through said opening, the annular seat within such head to receive the coil of a spring pressing the dog into engagement with the ratchet, the button having a spindle which passes through an oblong slot in the disk and is pivoted in the end of said dog, and the cam or latch of which rests against the outer face of the disk, and the rib upon said outer face, having a recess to receive said cam, whereby the dog may be thrown out of engagement by pushing the button laterally, and locked against return by rotating it until the cam or latch takes into said recess.

HENRY E. PRIDMORE.

Witnesses:
S. HOLTH,
JOHN V. A. HASBROOK.